US008437764B2

(12) United States Patent
Doettling et al.

(10) Patent No.: US 8,437,764 B2
(45) Date of Patent: May 7, 2013

(54) DETERMINING AN OPTIMIZED CONFIGURATION OF A TELECOMMUNICATION NETWORK

(75) Inventors: Martin Doettling, Neubiberg (DE); Ingo Viering, Munich (DE); Richard Waldhauser, München (DE)

(73) Assignee: Nokia Siemens Networks Oy, Espoo (FI)

( * ) Notice: Subject to any disclaimer, the term of this patent is extended or adjusted under 35 U.S.C. 154(b) by 87 days.

(21) Appl. No.: 13/143,127

(22) PCT Filed: Jan. 5, 2009

(86) PCT No.: PCT/EP2009/050032
§ 371 (c)(1),
(2), (4) Date: Aug. 22, 2011

(87) PCT Pub. No.: WO2010/076041
PCT Pub. Date: Jul. 8, 2010

(65) Prior Publication Data
US 2011/0300871 A1 Dec. 8, 2011

(51) Int. Cl.
*H04W 88/02* (2009.01)
(52) U.S. Cl.
USPC .......................................................... 455/446
(58) Field of Classification Search .................. 455/11.1, 455/436, 446, 466; 370/230, 329, 338
See application file for complete search history.

(56) References Cited

U.S. PATENT DOCUMENTS

| 5,697,055 A * | 12/1997 | Gilhousen et al. ............ 455/436 |
| 6,456,652 B1 | 9/2002 | Kim et al. ...................... 375/224 |
| 2005/0136911 A1 | 6/2005 | Csapo et al. ................... 455/423 |
| 2011/0140846 A1* | 6/2011 | Blanz et al. .................... 340/7.1 |
| 2011/0211514 A1* | 9/2011 | Hamalainen et al. ......... 370/311 |
| 2012/0108245 A1* | 5/2012 | Zhang et al. .................. 455/443 |
| 2012/0225657 A1* | 9/2012 | Watanabe et al. ............. 455/436 |
| 2012/0252440 A1* | 10/2012 | Watanabe ...................... 455/423 |
| 2012/0300686 A1* | 11/2012 | Maeda et al. ................. 370/311 |

FOREIGN PATENT DOCUMENTS
GB   2 311 912 A   10/1997

* cited by examiner

*Primary Examiner* — Diane Mizrahi
(74) *Attorney, Agent, or Firm* — Harrington & Smith

(57) ABSTRACT

It is described a method for determining an optimized configuration of a telecommunication network including a first base station serving first user equipments within a first cell and a second base station serving second user equipments within a second cell. The method includes (a) collecting first measurement reports from the first user equipments, (b) collecting second measurement reports from the second user equipments, (c) generating a first information based on the first measurement reports, wherein the first information is indicative for the current coverage situation within the first cell, (d) generating a second information based on the second measurement reports, wherein the second information is indicative for the current coverage situation within the second cell and (e) determining the optimized configuration of the telecommunication network based on the first and on the second information. It is further described a base station and a central network element, which are adapted to carry out the above described method.

16 Claims, 2 Drawing Sheets

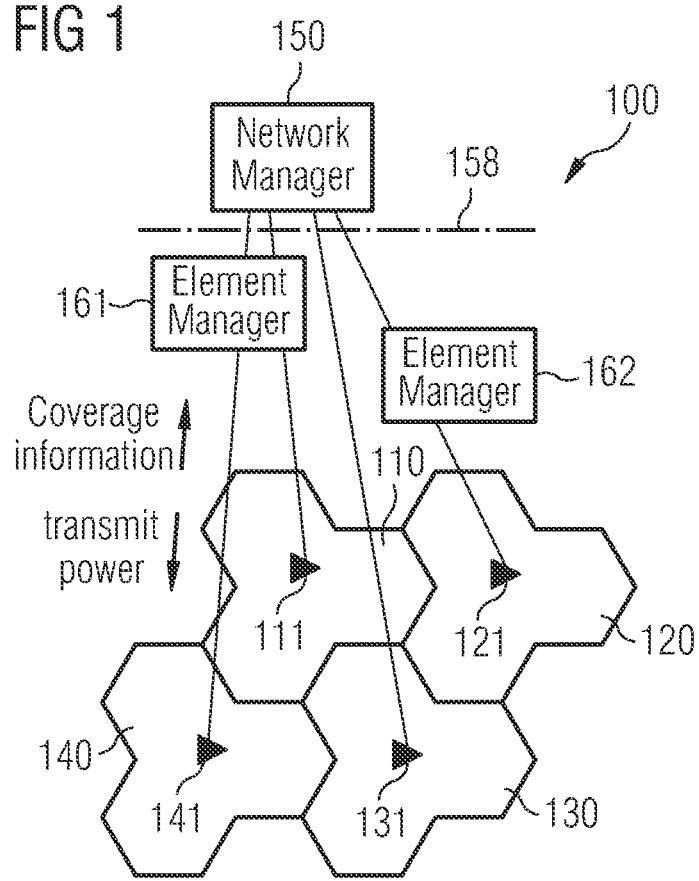
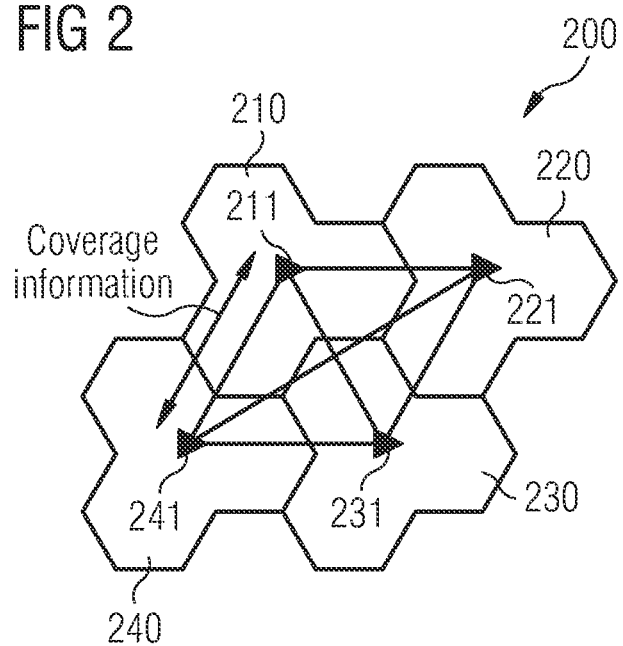

DETERMINING AN OPTIMIZED CONFIGURATION OF A TELECOMMUNICATION NETWORK

FIELD OF INVENTION

The present invention generally relates to the technical field of mobile wireless communications and is related more specifically to the system behavior of a cellular telecommunication network with the capability to perform a self optimization with respect to technical settings respectively the configurations of various network elements. Specifically, the present invention relates to a method for determining an optimized configuration of a telecommunication network comprising at least a first base station serving first user equipments within a first cell and a second base station serving second user equipments within a second cell. Further, the present invention relates to a base station and to a central network element, which are adapted to carry out at least some embodiments of the above described method. Furthermore, the present invention relates to a computer program for determining an optimized configuration of a telecommunication network.

ART BACKGROUND

For planning a new mobile telecommunication network or for expanding an already existing mobile telecommunication network, there are inter alia two important goals which however compete with each other. A first goal is an optimization of the spatial coverage of the telecommunication network. In order to achieve this goal one would like to increase the transmitting power of all base stations of the telecommunication network. The second goal is a low overall power consumption. In order to decrease the overall power consumption one would like to reduce the transmitting power of at least some base stations of the telecommunication network.

Planning or expanding a mobile telecommunication network is typically done offline by means of so called network planning tools. Those tools rely on the geographical data of the various network elements and evaluate the spatial coverage of the whole telecommunication network.

For planning and/or for configuring a telecommunication network one has to distinguish between (a) interference limited cells and (b) coverage limited cells.

Interference limited cells typically feature small inter site distances, high transmitting power and/or a small penetration loss. Interference limited cells do typically not have a coverage problem, the performance is limited by the interference of neighboring cells and not by thermal noise. Therefore, in order to provide for good radio conditions within neighboring cells the base stations serving these neighboring cells have to be considerate with respect to each other in order to reduce inter cell interference effects.

In highly interference limited cells, one could typically reduce the transmitting power of all base stations in a certain neighborhood without affecting the performance respectively the average cell data throughput. It is important to understand, that in this case the received signal strengths are significantly above thermal noise for all user equipments being connected to a particular base station.

Coverage limited cells have coverage holes or are at least close to having such coverage holes. The received signal strengths of weak user equipments are in the range of or even below the thermal noise. In this respect weak user equipments are mobile terminals, which have a poor radio connection with their serving base station. A poor radio connection may occur in particular at the cell edge or in shadowing holes for instance behind large buildings.

A coverage optimization may be necessary for instance because of different reasons such as a cell/base station failure, changing environments (e.g. a construction of a new building), a too aggressive minimization of the transmitting power of a base station and/or a too aggressive load balancing between neighboring cells.

In order to find a suitable tradeoff between (a) a small energy consumption (achievable with low transmitting powers) and (b) a good cell coverage (achievable with small transmitting powers) one has to configure the base stations of a telecommunication network in an appropriate and coordinated manner. In particular, one has to make sure that the base stations transmit their signals in the downlink direction with a suitable transmitting power.

There may be a need for providing an effective and reliable method for determining an optimized configuration of a telecommunication network. Further, there may be a need for providing network elements which are adapted to carry out such a method.

SUMMARY OF THE INVENTION

This need may be met by the subject matter according to the independent claims. Advantageous embodiments of the present invention are described by the dependent claims.

According to a first aspect of the invention there is provided a method for determining an optimized configuration of a telecommunication network comprising at least a first base station serving first user equipments within a first cell and a second base station serving second user equipments within a second cell. The provided method comprises (a) collecting first measurement reports by the first base station from the first user equipments, wherein the first measurement reports are indicative for the radio link quality between the first base station and the respective first user equipment, (b) collecting second measurement reports by the second base station from the second user equipments, wherein the second measurement reports are indicative for the radio link quality between the second base station and the respective second user equipment, (c) generating a first information by the first base station based on the first measurement reports, wherein the first information is indicative for the current coverage situation within the first cell, (d) generating a second information by the second base station based on the second measurement reports, wherein the second information is indicative for the current coverage situation within the second cell, and (e) determining the optimized configuration of the telecommunication network based on the first information and on the second information.

This first aspect of the invention is based on the idea that the network configuration can be optimized in a self organizing manner. Thereby, not only the first and the second measurement reports but also the first and the second information can be updated on a regular basis. As a consequence, the described determination of an optimized network configuration can be carried out regularly. This may provide the advantage that if for instance the overall radio conditions are linked to the seasons (in the wintertime there are less leaves on the trees which constrain the propagation of radio signals) the network configuration can be adapted accordingly.

The described determination of the optimized configuration can be carried out by any network element of the described telecommunication network. This network element may be connected directly or indirectly with the first and the second base station. The network element, which is carrying out the optimization based on the first and the second information, which have been acquired in a distributed manner, may also be called a decision making entity.

The first and/or the second user equipment may be any type of communication end device, which is capable of connecting with an arbitrary telecommunication network access point such as the first and/or the second base station by means of a wireless transmission link. In particular the user equipments may be a cellular mobile phone, a Personal Digital Assistant (PDA), a notebook computer and/or any other movable communication device.

According to an embodiment of the invention determining the optimized configuration of the telecommunication network comprises changing the value of at least one network configuration parameter. Thereby, the network configuration parameter may be any parameter which has an influence for instance on the radio signal propagation and/or on the spatial segmentation of cells within the telecommunication network.

Specifically, the network configuration parameter may be for instance a downtilt angle of an antenna of the first or the second base station. In this respect "downtilt angle" may denominate the angle between a horizontal axis and the antennas preferred direction for transmitting and receiving radio signals. Since base stations are typically located at an elevated position the described preferred direction is slightly inclined downwards in order to provide for a good radio link between the corresponding base station and a user equipment being currently served by the base station.

The network configuration may also be a parameter which determines the spatial distribution of radio access points such as base stations or relay nodes and/or the spatial course of a cell boundary. In particular, the network configuration parameter may be characteristic for the presence and/or the activation of a base station. This may mean that a change of the value of one or more network configuration parameters may cause a spatial shift of cell boundaries, may reflect an insertion of a new base station, may cause a removal of a currently deployed base station, may cause a switching on of an already deployed base station (or individual sectors of it) and/or may cause a switching off of a base station (or individual sectors of it).

According to a further embodiment of the invention determining the optimized configuration of the telecommunication network comprises changing the transmitting power of the first base station and/or of the second base station. This may provide the advantage that a good balance between (a) a good coverage and (b) an effective energy saving can be found out.

Since the described determination of the optimized configuration may rely only on operational conditions of network elements being assigned to the telecommunication network, the described method may represent a so called self organizing procedure. Correspondingly, the telecommunication network may represent a so called Self Organizing Network (SON).

In the described SON use case a decision making entity, which carries out the determination of the optimized telecommunication network configuration, requires information about the current coverage situation within at least the first and the second cell. The decision making entity may acquire this information from at least the first and the second base station or from a central network element, which has collected this information before from at least the first and the second base station. In other words, the first and the second base station may signal their information directly to the decision making entity or indirectly via a central node to the first and the second base station. Thereby, it is also possible that the central node is the decision making entity.

In this respect it is mentioned that the described SON functionality may provide the advantage that the effort associated with a telecommunication network planning can be reduced significantly. This holds in particular for the cumbersome acquisition of the geographical data of all base stations.

Furthermore and even more important, the described optimization of the network configuration can be more dynamic than known network optimization procedures. Therefore, the network configuration can be adopted in order to track particular changes such as for instance a difference in the data traffic with respect to the daytime. Typically, during the night there will be less data traffic than during the day.

According to a further embodiment of the invention the first information comprises a first measure being indicative for an interference limitation within the first cell and/or the second information comprises a second measure being indicative for an interference limitation within the second cell. Thereby, the interference limitation may be in particular a so called inter cell interference, wherein radio signals between a base station and a user equipment being connected to the base station represent a perturbation for the reception of radio signals within a neighbouring cell.

In this respect it is pointed out that the goals of (a) a small inter cell interference and (b) a good cell coverage are often in competition with each other. Of course, if one wants to improve the cell coverage the transmitting power will have to be increased. As a consequence, the interference between neighbouring cells will be increased.

According to a further embodiment of the invention the interference limitation is signaled by the corresponding base station by means of a quantized value. This may mean that a particular value out of at least two possible quantized values may indicate that the current interference limitation is within a predefined range of possible interference limitations. This may provide the advantage that the respective interference limitations can be signaled without a large signaling overload for instance to the decision making entity.

For instance, the signaling could be defined by the following quantized values each being associated with particular range of possible interference limitations: (a) highly interference limited, (b) slightly interference limited and (c) coverage limited. Upon reception of one of these values the decision make entity may know that the overall transmitting power (a) could be reduced, (b) should not be changed or (c) must be increased.

According to a further embodiment of the invention the first information comprises a first received signal strength, which is exceeded by a first fraction of first user equipments being connected to the first base station, and the second information comprises a second received signal strength, which is exceeded by a second fraction of second user equipments being connected to the second base station. This may provide the advantage that very accurate first and/or second information can be signaled by the respective base station to the decision making entity.

At present a fraction of for instance 98% seems to be a reasonable choice. This fraction corresponds to a certain received signal strength, which will be exceeded by 98% of all user equipments being served by the respective base station. In other words, the measurement reports of 2% of the user equipments may not be taken into account for generating the first and/or the second information being indicative for the current coverage situation within the respective cell. This may provide the advantage that those user equipments, which have carried out an erroneous measurement and, as a consequence, have signaled an erroneous measurement report to their base station, are not able to report an in truth not existing coverage hole. Generally speaking, the certain received signal strength, which corresponds to the fraction of 98% may represent a good compromise between (a) a small inter cell interference and (b) a good cell coverage. This means further that within the respective cell at least 98% of all user equipments are connectable to the respective base station.

The decision making entity could compare the first and/or the second signal strength with the thermal noise level, which is known at least roughly. Thereby, the decision making entity may get a more accurate knowledge about the spatial coverage within the respective cell.

In this respect it is mentioned that in Long Term Evolution (LTE) telecommunication networks the received signal strength is called Reference Signal Received Power (RSRP). Within a LTE network, wherein the described optimized configuration determination method is carried out, the signaling between the respective base station (eNodeB) and the decision making entity could not include an absolute RSRP value but rather a differential value compared to the thermal noise level.

According to a further embodiment of the invention the first measurement reports and/or the second measurement reports are collected within a predefined period of time. This may mean that the first information being indicative for the current coverage situation within the first cell and/or the second information being indicative for the current coverage situation within the second cell may be based on measurement reports which have been collected over a sufficiently long time such as for instance one or more hours or one or more days. Thereby, it can be made sure that measurement reports from almost all possible positions within a cell are captured and taken into account for the described optimized configuration determination.

A sufficient long time period for collecting measurement reports may be important in particular for first and/or second information indicating highly interference limited cells because this may induce optimization and reconfiguring decisions which bring the cell(s) closer to a coverage limit. If the first and/or the second information are not reliable enough such decisions may decrease the service quality provided within the cell being served by the reconfigured base station.

According to a further embodiment of the invention the first measurement reports and/or the second measurement reports are collected within an adjustable period of time, which depends on the expected current coverage situation within the respective cell. Thereby, first and/or second information being indicative for a coverage limitation within the respective cell can be signaled earlier to a decision making entity as first and/or second information being indicative for an inter cell interference limitation within the respective cell. This may provide the advantage coverage holes within a cell can be removed comparatively fast. This can be done in particular by increasing the transmitting power in a coordinated manner within the whole telecommunication network.

It is mentioned that if a coverage hole has been detected erroneously the resulting incorrect increase of the transmitting power will only lead to a reduced energy saving and/or to an increased energy consumption. The service quality for the first and/or the second user equipments will not degrade.

The expected current coverage situation within the first and/or second cell can be figured out by the respective base station by generating provisional first and/or second information. Thereby, compared to the information generation described above only a dataset including a reduced number of measurement reports can be taken into account. Of course, this reduced dataset can be acquired within a shorter period of time as compared to a full dataset. As a consequence, the corresponding provisional information is firstly less accurate than the above described first and/or second information. However, the provisional first and/or second information can be considered as to be quite reliable in case a coverage hole is detected. This is the case because only one single measurement report may be sufficient in order to reliably identify a coverage hole.

According to a further embodiment of the invention the method is carried out within a telecommunication network, which further comprises at least one further base station serving further user equipments within a further cell. The method further comprises (a) collecting further measurement reports by the further base station from the further user equipments, wherein the further measurement reports are indicative for the radio link quality between the further base station and the respective further user equipment, and (b) generating a further information by the further base station based on the further measurement reports, wherein the further information is indicative for the current coverage situation within the further cell and wherein determining the optimized configuration of the telecommunication network further takes into account the further information.

The described method can be carried out within a telecommunication network having any size. There is no principal limitation with respect to the number of cells respectively with respect to the number of base stations which are involved in a coordinated configuration optimization. Of course, the amount of data which has to be signaled and which has to be evaluated increases with the number of involved base stations. However, since in the described method each base station condenses the original data amount corresponding to the plurality of measurement reports to the information being indicative for the current coverage situation within the respective cell, the overall data amount can be kept within acceptable limits.

According to a further embodiment of the invention determining the optimized configuration of the telecommunication network is carried out by a central network element. The central network element may be for instance a network managing entity. The network managing entity may be connected at least to the first and to the second base station via a standardized management interface.

The network managing entity may be connected directly or indirectly via an element managing entity to one or more base station. Further, a radio network controller may be used to connect a plurality of base stations to the network managing entity.

Generally speaking, the above described collection of measurement reports in order to generate information being indicative for the current coverage information within the respective cell is controlled by a central node, which informs the base stations by an appropriate signaling over a management interface.

The described central approach for determining an optimized network configuration may provide the advantage that the whole method can be carried out in a well organized and ordered sequence. In this respect it is pointed out that the described central approach currently seems to represent the better solution as compared to a decentral approach, which is described further below.

It is mentioned that the values for the aforementioned first fraction and/or second fraction can be signaled to the respective base station by the central network element. Thereby, the central network element may define a policy within the whole telecommunication network about the tradeoff between (a) a small energy consumption and (b) a good cell coverage.

It is further mentioned that also the above mentioned adjustment of the period of time, which is associated with a different reporting behavior for coverage holes as compared to interference limitations, can be controlled or configured by the central network element.

According to a further embodiment of the invention determining the optimized configuration of the telecommunication network is carried out in a decentral manner by at least the first base station and the second base station.

The described decentral approach is in particular advantageous for an LTE telecommunication network. Thereby, every base station may collect the information being indicative for the current coverage situation within its cell and provides this information to its neighbouring base stations. In other words, each base station receives coverage information from its neighbor base stations and adjusts its settings such as for instance the transmitting power or the downtilt angle accordingly. Thereby, since each base station typically comprises not only one neighbor base station, a coordinated reconfiguration of the whole telecommunication network can be achieved.

In a LTE telecommunication network the signaling between different base stations which inform each other about their current coverage situation can be carried out via the standardized X2-interface.

According to a further embodiment of the invention the method further comprises providing policy information from a central network element to at least the first base station and/or to the second base station. This may provide the advantage that policy information for configuring the base stations and/or the whole telecommunication network can be distributed to the various base stations in an effective and reliable manner. Thereby, operator rules can be conveyed to the base stations by additional signaling information originating from the central network element. For signaling the policy information management interfaces can be employed, which may also be used for operation and maintenance procedures.

According to a further embodiment of the invention the method further comprises (a) transmitting a common trigger signal from a central network element to at least the first and the second base station and (b) activating a new value for at least one network configuration parameter being associated with the determined optimized configuration of the telecommunication network in response to the reception of the common trigger signal by at least the first and the second base station. This may provide the advantage that new values, which are related to an updated and optimized configuration of the telecommunication network, may become effective in a synchronized manner. Thereby, each network element, which is affected by the optimized configuration of the telecommunication network, will enter its new configuration at least approximately at the same time. As a beneficial consequence, the telecommunication network can be reconfigured during its usual operation without having the risk for loosing messages during the reconfiguration procedure. Therefore, the overall operation of a telecommunication network will be more reliable.

It has to be mentioned that the described trigger transmission by the central network element represents centralized trigger procedure. Therefore, although the determination of the optimized configuration of the telecommunication network follows a decentral approach, the described method also has characteristics of a central approach. In this respect the described embodiment of the optimized configuration determination method represents a hybrid approach, which comprises both central and decentral characteristics.

According to a further aspect of the invention there is provided a first base station of a telecommunication network. The provided first base station comprises (a) a unit for collecting first measurement reports from first user equipments, which are located within a first cell and which are served by the first base station, wherein the first measurement reports are indicative for the radio link quality between the first base station and the respective first user equipment, (b) a unit for generating a first information by the first base station based on the first measurement reports, wherein the first information is indicative for the current coverage situation within the first cell, (c) a unit for providing the first information to an external entity being assigned to the telecommunication network, and (d) a unit for receiving external information from the external entity. Thereby, (i) the external information is based on the first information and at least on a second information, which has been generated by a second base station based on second measurement reports, (ii) the second measurement reports have been collected by the second base station from second user equipments being located within a second cell and being served by the second base station, and (iii) the second measurement reports are indicative for the radio link quality between the second base station and the respective second user equipment. The described first base station is adapted to adapt its configuration based on the external information.

This further aspect of the invention is based on the idea that the configuration of the base station can be optimized in a self organizing manner. Since the described method can be simultaneously carried out for other base stations, the method can be used for reconfiguring a whole telecommunication network in an appropriate and effective manner.

The described external entity may be for instance the mentioned second base station (decentral approach) or a central network element (central approach).

In cooperation with a second base station and, when pursuing the aforementioned central approach also in cooperation with a central network element, the described first base station may be adapted to carry out any embodiment of the above described method for determining an optimized configuration of a telecommunication network.

The described first base station can contribute to a centralized or decentralized optimized configuration determination. With centralized algorithms, a central network element would collect all the necessary information and would instruct the involved base stations to adjust their settings. With a de-centralized algorithm such a central network element is not employed. The base stations mutually exchange information and do the adjustments on their own.

According to a further aspect of the invention there is provided a central network element for determining an optimized configuration of a telecommunication network comprising at least a first base station serving first user equipments within a first cell and a second base station serving second user equipments within a second cell. The central network element comprises (a) a unit for receiving a first information from the first base station, wherein the first information is indicative for the current coverage situation within the first cell, wherein the first information has been generated by the first base station based on first measurement reports, wherein the first measurement reports have been collected by the first base station from the first user equipments and wherein the first measurement reports are indicative for the radio link quality between the first base station and the respective first user equipment, (b) a unit for receiving a second information from the second base station, wherein the second information is indicative for the current coverage situation within the second cell, wherein the second information has been generated by the second base station based on second measurement reports, wherein the second measurement reports have been collected by the second base station from the second user equipments and wherein the second measurement reports are indicative for the radio link quality between the second base station and the respective second user equipment, and (c) a unit for determining the optimized configuration of the telecommunication network based on the first information and on the second information.

This further aspect of the invention is based on the idea that the network configuration can be optimized by using a central network element, which (i) receives coverage information from at least the first and the second base station and which (ii) provides appropriate information to all the involved base station in order to adapt their respective configuration a an appropriate and coordinated manner.

In cooperation with at least the first and the second network element the described central network element may be adapted to carry out any embodiment of the above described method, which relies on the central approach for determining an optimized configuration of the telecommunication network.

According to a further aspect of the invention there is provided a computer program for determining an optimized configuration of a telecommunication network comprising at least a first base station serving first user equipments within a first cell and a second base station serving second user equipments within a second cell. The computer program, when being executed by a data processor, is adapted for controlling any embodiment of the method as described above.

As used herein, reference to a computer program is intended to be equivalent to a reference to a program element and/or a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

FIG. 1 shows a telecommunication network whose configuration is optimized by employing a centralized approach for adjusting the transmitting power of each base station in a coordinated manner.

FIG. 2 shows a telecommunication network whose configuration is optimized by employing a de-centralized approach for adjusting the transmitting power of each base station in a coordinated manner.

DETAILED DESCRIPTION

Figure 3:
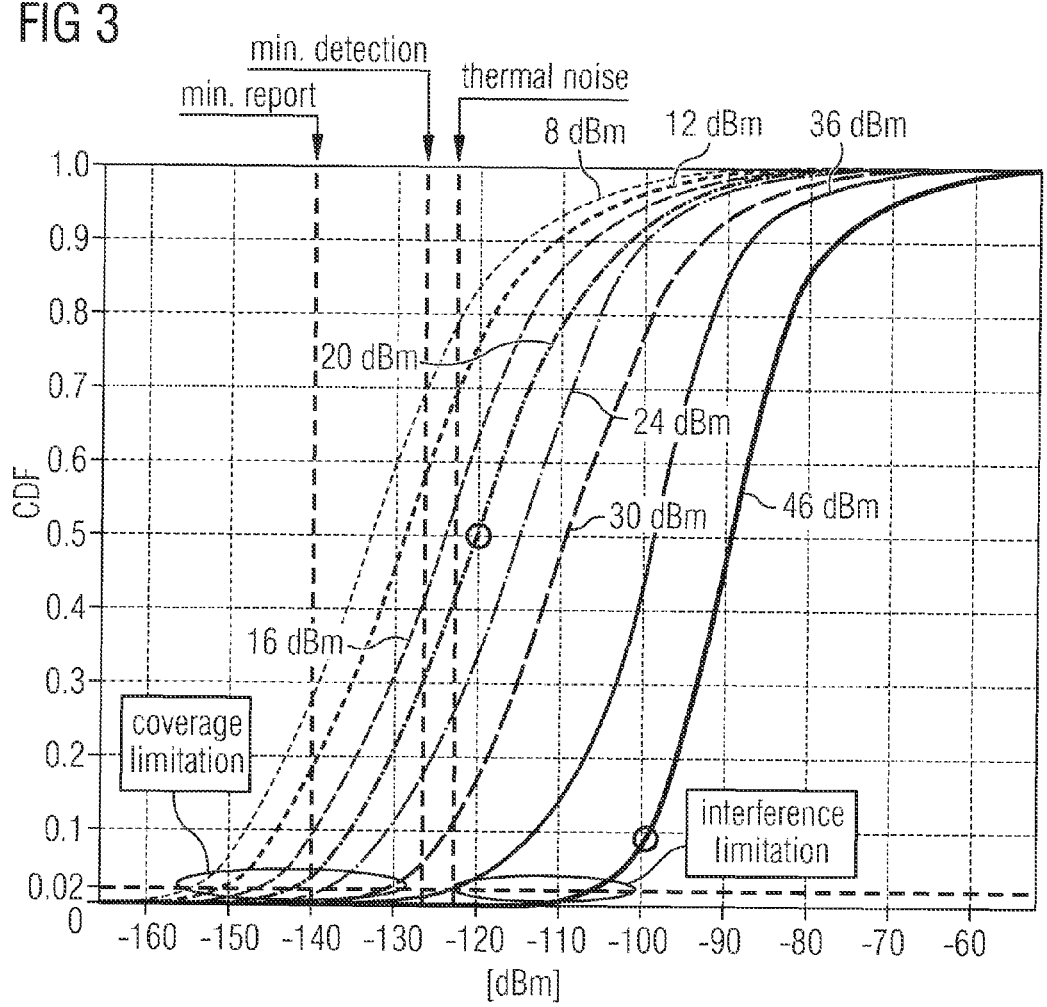
FIG. 3 shows a simulation of the cumulative distribution functions (CDF) of Reference Signal Received Power (RSRP) measurements reported by user equipments which are connected to a particular base station transmitting its signals with 8 different transmitting power levels.

The illustration in the drawing is schematically. It is noted that in different figures, similar or identical elements are provided with reference signs, which are different from the corresponding reference signs only within the first digit.

FIG. 1 shows a telecommunication network 100, whose configuration is optimized by applying a centralized approach for adjusting the transmitting power of each base station in a coordinated manner. The telecommunication network 100 comprises a plurality of base stations each spanning a cell of the telecommunication network 100. According to the embodiment described here each cell can be subdivided into three sectors.

For the sake of clarity only four base stations and the corresponding cells are depicted in FIG. 1. Further, user equipments which are located within the various cells have been omitted.

As can be seen from FIG. 1, a first base station 110 serves user equipments being located within a first cell 111, a second base station 120 serves user equipments being located within a second cell 121, a third base station 130 serves user equipments being located within a third cell 131 and a fourth base station 140 serves user equipments being located within a fourth cell 141.

The telecommunication network further comprises a central network element 150. According to the embodiment described here the central network element is a network manager 150. Via a management interface 158 the central network element 150 is connected to each one of the base stations 111, 121, 131, 141. The connection between the central network element 150 and the third base station 131 is a direct connection. The connections between the central network element 150 and the other base stations 111, 121, 141 are indirect connections via a network element managing entity 161 or 162.

Each base station 111, 121, 131 and 141 collects measurement reports from its served user equipments. Based on these measurement reports each base station 111, 121, 131 and 141 generates a coverage information, which is indicative for the current coverage situation within the respective cell.

The base stations 111, 121, 131 and 141 then signal the generated coverage information to the central network element 150 via the management interface 158 and, if applicable, also via the network element managing entity 161 or 162.

The central network element 150 collects the information from all base stations 111, 121, 131 and 141 of a neighborhood and instructs the base stations 111, 121, 131 and 141 to adjust their settings. This instruction is forwarded to the respective base station again via the management interface 158 and, if applicable, also via the network element managing entity 161 or 162.

According to the embodiment described here the transmitting power of each base station 111, 121, 131 and 141 is adjusted. However, it is mentioned that also other parameters such as for instance an activation parameter for the respective base station or a downtilt angle of the antenna of the respective base station can be adjusted.

FIG. 2 shows a telecommunication network 200 whose configuration is optimized by employing a de-centralized approach for adjusting the transmitting power of each base station in a coordinated manner. Also the telecommunication network 200 comprises a plurality of base stations each spanning a cell of the network 200.

As can be seen from FIG. 2, a first cell 210 is assigned to a first base station 211, a second cell 220 is assigned to a second base station 221, a third cell 230 is assigned to a third base station 231 and a fourth cell 240 is assigned to a fourth base station 241.

Each base station 211, 221, 231 and 241 collects measurement reports from its served user equipments. Based on these measurement reports each base station 211, 221, 231 and 241 generates a coverage information, which is indicative for the current coverage situation within the respective cell.

Then, the base stations 210, 220, 230 and 240 signal the generated coverage information to their neighboring base stations. In an LTE telecommunication network this can be done via a standardized X2 interface. Every base station 210, 220, 230 and 240 collects the received coverage information from its neighbors and adjusts its settings accordingly.

In accordance with the embodiment shown in FIG. 1 the transmitting power of each base station 211, 221, 231 and 241 is adjusted. Again, also other parameters such as for instance an activation parameter for the respective base station or a downtilt angle of the antenna of the respective base station can be adjusted.

It is mentioned that also in the de-centralized approach shown in FIG. 2 a non depicted central network element can be used. Such a network element may provide policy information given for instance by the operator of the telecommunication network 200 to the various base stations via appropriate management interfaces. The policy information may be indicative in particular for configuration adjustment rules, which affect the configuration adjustment of each base station 211, 221, 231 and 241.

FIG. 3 shows the cumulative distribution functions (CDF) of the Reference Signal Received Power (RSRP) measurements reported by the user equipments being connected to a particular base station. In FIG. 3 there are depicted altogether eight CDFs, which are associated with the different base station transmitting powers 46 dBm, 36 dBm, 30 dBm, 24 dBm, 20 dBm, 16 dBm, 12 dBm and 8 dBm. Each CDF shows for each power value within a power range between "zero" and the "output power of the base station" the percentage of user equipments, which receive a signal power which is smaller than this power value.

For instance from the 46 dBm CDF one can see that statistically about 9% of all user equipments being distributed within the respective cell receive a signal power of less than −100 dBm. Further, for instance from the 20 dBm CDF one can see that statistically about 50% of all user equipments being distributed within the respective cell receive a signal power of less than −120 dBm. Since CDFs and their statistical significance are widely known in the field of telecommunication networks, hereinafter no further technical details are given.

For all CDFs shown in FIG. 3 a sufficiently large period of time is assumed for collecting measurement reports from the served user equipments. The simulations yielding the CDFs are based on the well known 3GPP case 1, which defines an Inter Site Distance (ISD) of 500 m and a 20 dB penetration loss. The black horizontal dashed line shows the 2% line, which indicates a spatial coverage of 98%. Such a coverage can be considered as to be sufficient in order to operate a mobile network in such a manner that the subscribers are satisfied.

In order to inform the central network node 150 (FIG. 1, centralized approach) or the neighboring base stations (FIG. 2, de-centralized approach) about the coverage situation the base station may signal the CDF value intersecting the 2% line, e.g. ∼−107 dBm, ∼−121 dBm and ∼−130 dBm for 46 dBm, 36 dBm and 30 dBm transmitting power, respectively.

Comparing those values with the thermal noise level, which is around −122 dBm and which is indicated in FIG. 3 with a vertical dashed line, the central network node 150 (FIG. 1, centralized approach) or the neighboring base stations (FIG. 2, de-centralized approach) can get a clear idea about the coverage situation in the cell. For the sake of completeness, FIG. 3 also shows the minimum RSRP level, which the user equipments are required to detect (min. detection), and the minimum RSRP level, which can be reported by the user equipments (min. report).

It can be read that a base station transmitting with 46 dBm causes a highly interference limited cell, a 36 dBm transmitting base station causes a slightly interference limited cell, and a 30 dBm or lower transmitting base station tends more and more to a coverage limited cell.

The method for determining an optimized configuration of a telecommunication network described in this patent application comprises at least the following advantages:
  The method requires only a signaling which generates only a negligible signaling load. The signaling can be very slow and it requires just a single value.
  External network entities can be provided with a relatively accurate and quantitative indication on the current interference/coverage limit of the respective cell.
  The method enables a variety of dynamic SON features which affect coverage, energy consumption and capacity for data throughput.
  The method does not require new user equipment measurements to be defined. All necessary information in order to realize an effective configuration optimization can be retrieved from the RSRP measurements which are already specified.

Figure 4:
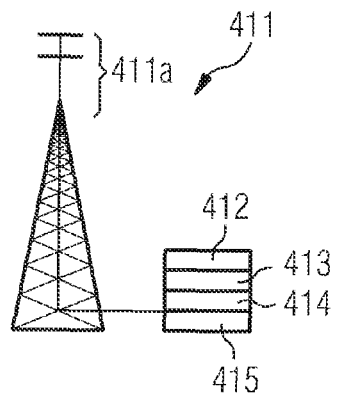
FIG. 4 shows a first base station in accordance with an embodiment of the invention.

FIG. 4 shows a first base station 411 in accordance with an embodiment of the invention. The first base station 411 comprises an antenna 411a for receiving radio signals from served user equipments and for transmitting radio signals to served user equipments.

The first base station 411 comprises a unit 412 for collecting first measurement reports from first user equipments, which are located within a first cell and which are served by the first base station. The first measurement reports are indicative for the radio link quality between the first base station 411 and the respective first user equipment.

The first base station 411 further comprises a unit 413 for generating a first information by the first base station 411 based on the first measurement reports. Thereby, the first information is indicative for the current coverage situation within the first cell.

The first base station 411 further comprises a unit 414 for providing the first information to an external entity being assigned to the telecommunication network.

The first base station 411 further comprises a unit 415 for receiving external information from the external entity. Thereby, (a) the external information is based on the first information and at least on a second information, which has been generated by a second base station based on second measurement reports, (b) the second measurement reports have been collected by the second base station from second user equipments being located within a second cell and being served by the second base station and (c) the second measurement reports are indicative for the radio link quality between the second base station and the respective second user equipment.

The first base station 411 is adapted to adapt its configuration based on the external information.

Figure 5:
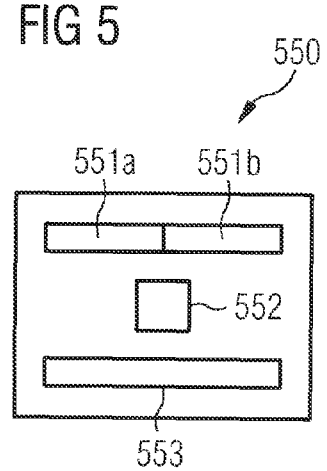
FIG. 5 shows central network element in accordance with an embodiment of the invention.

FIG. 5 shows in accordance with an embodiment of the invention a central network element 550 for determining an optimized configuration of a telecommunication network comprising at least a first base station serving first user equipments within a first cell and a second base station serving second user equipments within a second cell. The central network element 550 comprises a unit 551*a* for receiving a first information from the first base station, wherein (a) the first information is indicative for the current coverage situation within the first cell, wherein (b) the first information has been generated by the first base station based on first measurement reports, wherein (c) the first measurement reports have been collected by the first base station from the first user equipments and wherein (d) the first measurement reports are indicative for the radio link quality between the first base station and the respective first user equipment.

The central network element 550 further comprises a unit 551*b* for receiving a second information from the second base station, wherein (a) the second information is indicative for the current coverage situation within the second cell, wherein (b) the second information has been generated by the second base station based on second measurement reports, wherein (c) the second measurement reports have been collected by the second base station from the second user equipments and wherein (d) the second measurement reports are indicative for the radio link quality between the second base station and the respective second user equipment.

The central network element 550 further comprises a unit (552) for determining the optimized configuration of the telecommunication network based on the first information and on the second information.

According to the embodiment described here the central network element 550 further comprises an output unit 553 for forwarding at least one value representing at least a part of the optimized configuration to the first station and to the second base station.

In order to recapitulate the above described embodiments of the present invention one can state:

It is described a method for determining an optimized configuration of a telecommunication network (100) comprising a first base station (111) serving first user equipments within a first cell (110) and a second base station (121) serving second user equipments within a second cell (120). The method comprises (a) collecting first measurement reports from the first user equipments, (b) collecting second measurement reports from the second user equipments, (c) generating a first information based on the first measurement reports, wherein the first information is indicative for the current coverage situation within the first cell (110), (d) generating a second information based on the second measurement reports, wherein the second information is indicative for the current coverage situation within the second cell (120) and (e) determining the optimized configuration of the telecommunication network (100) based on the first and on the second information. It is further described a base station (411) and a central network element (550), which are adapted to carry out the above described method.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 telecommunication network
110 first cell
111 first base station
120 second cell
121 second base station
130 third cell
131 third base station
140 fourth cell
141 fourth base station
150 central network element/network manager
158 management interface
161 network element managing entity
162 network element managing entity
200 telecommunication network
210 first cell
211 first base station
220 second cell
221 second base station
230 third cell
231 third base station
240 fourth cell
241 fourth base station
411 base station
411*a* antenna
412 collecting unit
413 generating unit
414 providing unit
415 receiving unit
550 central network element/network manager
551*a* receiving unit
551*b* receiving unit
552 determining unit/processing unit
553 output unit

The invention claimed is:

1. Method for determining an optimized configuration of a telecommunication network comprising at least a first base station serving first user equipments within a first cell and a second base station serving second user equipments within a second cell, the method comprising collecting first measurement reports by the first base station from the first user equipments, wherein the first measurement reports are indicative for the radio link quality between the first base station and the respective first user equipment, collecting second measurement reports by the second base station from the second user equipments, wherein the second measurement reports are indicative for the radio link quality between the second base station and the respective second user equipment, generating a first information by the first base station based on the first measurement reports, wherein the first information is indicative for the current coverage situation within the first cell, generating a second information by the second base station based on the second measurement reports, wherein the second information is indicative for the current coverage situation within the second cell, and determining the optimized configuration of the telecommunication network based on the first information and on the second information.

2. The method as set forth in claim 1, wherein determining the optimized configuration of the telecommunication network comprises changing the value of at least one network configuration parameter.

3. The method as set forth in claim 1, wherein
determining the optimized configuration of the telecommunication network comprises changing the transmitting power of the first base station and/or of the second base station.

4. The method as set forth in claim 1, wherein the first information comprises a first measure being indicative for an interference limitation within the first cell and/or wherein the second information comprises a second measure being indicative for an interference limitation within the second cell.

5. The method as set forth in claim 4, wherein the interference limitation is signaled by the corresponding base station by means of a quantized value.

6. The method as set forth in claim 1, wherein the first information comprises a first received signal strength, which is exceeded by a first fraction of first user equipments being connected to the first base station, and wherein the second information comprises a second received signal strength, which is exceeded by a second fraction of second user equipments being connected to the second base station.

7. The method as set forth in claim 1, wherein the first measurement reports and/or the second measurement reports are collected within a predefined period of time.

8. The method as set forth in claim 1, wherein the first measurement reports and/or the second measurement reports are collected within an adjustable period of time, which depends on the expected current coverage situation within the respective cell.

9. The method as set forth in claim 1, wherein the telecommunication network further comprises at least one further base station serving further user equipments within a further cell, the method further comprising
collecting further measurement reports by the further base station from the further user equipments, wherein the further measurement reports are indicative for the radio link quality between the further base station and the respective further user equipment, and
generating a further information by the further base station based on the further measurement reports, wherein the further information is indicative for the current coverage situation within the further cell, wherein determining the optimized configuration of the telecommunication network further takes into account the further information.

10. The method as set forth in claim 1, wherein determining the optimized configuration of the telecommunication network is carried out by a central network element.

11. The method as set forth in claim 1, wherein determining the optimized configuration of the telecommunication network is carried out in a decentral manner by at least the first base station and the second base station.

12. The method as set forth in claim 11, further comprising providing policy information from a central network element to at least the first base station and/or to the second base station.

13. The method as set forth in claim 11, further comprising
transmitting a common trigger signal from a central network element to at least the first and the second base station and
activating a new value for at least one network configuration parameter being associated with the determined optimized configuration of the telecommunication network in response to the reception of the common trigger signal by at least the first and the second base station.

14. A computer program for determining an optimized configuration of a telecommunication network comprising at least a first base station serving first user equipments within a first cell and a second base station serving second user equipments within a second cell, the computer program, when being executed by a data processor, is adapted for controlling the method as set forth in claim 1.

15. A first base station of a telecommunication network, the first base station comprising
a unit for collecting first measurement reports from first user equipments, which are located within a first cell and which are served by the first base station, wherein the first measurement reports are indicative for the radio link quality between the first base station and the respective first user equipment,
a unit for generating a first information by the first base station based on the first measurement reports, wherein the first information is indicative for the current coverage situation within the first cell,
a unit for providing the first information to an external entity being assigned to the telecommunication network, and
a unit for receiving external information from the external entity,
whereby the external information is based on the first information and at least on a second information, which has been generated by a second base station based on second measurement reports,
whereby the second measurement reports have been collected by the second base station from second user equipments being located within a second cell and being served by the second base station, and
whereby the second measurement reports are indicative for the radio link quality between the second base station and the respective second user equipment, wherein the first base station is adapted to adapt configuration based on the external information.

16. A central network element for determining an optimized configuration of a telecommunication network comprising at least a first base station serving first user equipments within a first cell and a second base station serving second user equipments within a second cell the central network element comprising
a unit for receiving a first information from the first base station, wherein the first information is indicative for the current coverage situation within the first cell, wherein the first information has been generated by the first base station based on first measurement reports, wherein the first measurement reports have been collected by the first base station from the first user equipments and wherein the first measurement reports are indicative for the radio link quality between the first base station and the respective first user equipment, a unit for receiving a second information from the second base station, wherein the second information is indicative for the current coverage situation within the second cell, wherein the second information has been generated by the second base station based on second measurement reports, wherein the second measurement reports have been collected by the second base station from the second user equipments and wherein the second measurement reports are indicative for the radio link quality between the second base station and the respective second user equipment, and a unit for determining the optimized configuration of the telecommunication network based on the first information and on the second information.

\* \* \* \* \*